US005258781A

United States Patent [19]

John

[11] Patent Number: 5,258,781

[45] Date of Patent: Nov. 2, 1993

[54] ONE-STEP ENCAPSULATION, AIR GAP SEALING AND STRUCTURE BONDING OF THERMAL INK JET PRINTHEAD

[75] Inventor: Peter J. John, Rochester, N.Y.

[73] Assignee: Xerox Corporation, Stamford, Conn.

[21] Appl. No.: 865,420

[22] Filed: Apr. 8, 1992

[51] Int. Cl.[5] .......... G01D 15/18

[52] U.S. Cl. .......... 346/140 R; 156/626; 156/633; 346/1.1

[58] Field of Search .......... 346/140 R, 1.1, 75; 156/626, 633, 634, 647, 662, 644–645, 651–653, 657, 656

[56] References Cited

U.S. PATENT DOCUMENTS

Re. 32,572 1/1988 Hawkins et al. .......... 156/626
4,392,907 7/1983 Shirato et al. .
4,430,594 2/1984 Bork et al. .......... 310/328
4,540,151 9/1985 Pointner et al. .......... 346/155 X
4,607,268 8/1986 Pointner et al. .......... 346/155
4,612,554 9/1986 Poleshuk .
4,633,274 12/1986 Matsuda .......... 346/140 R
4,639,748 1/1987 Drake et al. .......... 346/140 R
4,786,357 11/1988 Campanelli et al. .......... 156/633

*Primary Examiner*—A. T. Grimley
*Assistant Examiner*—Thu Dang
*Attorney, Agent, or Firm*—Oliff & Berridge

[57] ABSTRACT

A one-step process bonds a manifold to a printhead die and interconnection board located on a heat sinking substrate, encapsulates wire bonds extending from the interconnection board and the printhead die, and seals air gaps between the manifold and printhead die. A through hole is made in the heat sink substrate and communicates with a cavity defined by the manifold. During assembly, the manifold is positioned on top of the substrate containing the printhead die and the interconnection board and retained by pins. An encapsulation fluid is injected from an underside of the substrate through the through hole and into the cavity. Injection is stopped when the fluid flows nearly to the front of the printhead. The process provides encapsulation of wire bonds, sealing of any air gap between the manifold and the printhead along a front face, and enhances structural bonding of the manifold to printhead components.

20 Claims, 6 Drawing Sheets

ONE-STEP ENCAPSULATION, AIR GAP SEALING AND STRUCTURE BONDING OF THERMAL INK JET PRINTHEAD

BACKGROUND OF THE INVENTION

1. Field of the Invention

The present invention relates to a one-step process for bonding a manifold to a printhead and interconnection board located on a heat sinking substrate. The one-step process provides encapsulation of wire bonds, sealing of any air gap between the manifold and the printhead along a front face, and enhances structural bonding of the manifold to printhead components.

2. Description of Related Art

The thermal ink jet printhead is a device which ejects fluid (ink) in a controllable fashion by means of electrical pulses passed through resistive heating elements which are in thermal contact with the ink. Ink from a reservoir travels through a manifold located above the printhead and into the printhead through an ink inlet. A printhead die consists of a channel plate (in which fluidic pathways are formed for example by etching) bonded on top of a heater plate (containing heating elements, leads and preferably some addressing electrodes to reduce required interconnection density). Insofar as possible, the microelectric packaging of the printhead die follows IC and hybrid industry standard methods such as epoxy die bonding of the silicon device onto the substrate, as well as wire bonding to accomplish electrical interconnection. However, the fluidic handling requirements of the printhead give rise to additional packaging requirements.

A water tight seal needs to be formed between the manifold and the die to contain the ink in the proper channels for delivery without leakage from the manifold. However, this watertight seal is not strong enough or extensive enough to provide a good structural bond between the manifold, the printhead die and other printhead components.

In addition, when the manifold is placed over the die, there is a small air gap between the ends of the die and the legs of the manifold. The air gap, if not filled, allows a passageway for humid air to escape when the printhead is capped, so that the cap does not effectively prevent evaporation of volatile ink components.

Additionally, wire bonds connecting the die to an interconnection board need to be encapsulated to provide protection against mechanical damage and corrosion.

Prior printhead manufacturing techniques address some of these problems individually, such as U.S. Pat. No. 4,612,554 to Poleshuk which bonds a printhead to a daughterboard and wire bonds electrodes of the printhead with corresponding electrodes of the daughterboard. The wire bonds are then encased in an insulative epoxy. The disclosure of U.S. Pat. No. 4,612,554 is herein incorporated by reference.

However, prior printhead manufacturing techniques implement several individual processes to provide a printhead which is wire bonded to an interconnection board and to seal any air gap. Additionally, these prior printheads are deficient in structural bond integrity between the manifold and various printhead components. All of these previous manufacturing techniques involve excess processing time and expense or are deficient in structural integrity or air gap filling.

There is a need for a process which can address all of these problems and provide good structural bonding in a single step to reduce printhead manufacturing costs and provide an enhanced structural bond between the manifold and other printhead components.

OBJECTS AND SUMMARY OF THE INVENTION

It is an object of the present invention to provide a one-step process for bonding a manifold to a printhead die and interconnection board located on a heat sinking substrate to form a thermal ink jet printhead.

It is another object of the present invention to provide a one-step process which provides encapsulation of wire bonds, sealing of any air gap between the manifold and the printhead along a front face, and enhance structural bonding of the manifold to printhead components.

In accordance with the present invention, a method of bonding components of a thermal ink jet comprises the steps of positioning a manifold having opposing legs over a printhead die and an interconnection board, both being previously bonded to a heat sinking substrate having a through hole located between the printhead die and the interconnection board, and injecting a liquid encapsulant into the through hole and into a cavity defined between the substrate and the manifold to encapsulate wire bonds between the printhead die and the interconnection board and fill any air gap between the printhead die and the legs of the manifold along a front face thereof.

In addition, the invention relates to a thermal ink jet printhead comprising a heat sinking substrate having a through hole formed therein, a printhead die mounted on the substrate on one side of the through hole and comprising a channel section with an ink inlet and a heater section with a row of wire bond pads, an intermediate board bonded to the substrate on an opposite side of the through hole and having a corresponding row of wire bond pads, a plurality of wire bonds electrically interconnecting the rows of wire bond pads on the heater section and the interconnection board, a manifold mounted to the substrate and defining therein a cavity for reception of the printhead die, interconnection board and plurality of wire bonds, the manifold including an ink inlet for communication with the ink inlet of the channel section, and the through hole communicating with the cavity and the cavity containing an encapsulant injected through the through hole for encapsulating the wire bonds, sealing air gaps between the manifold and the printhead die, and bonding the manifold to the substrate.

These and other objects will become apparent from a reading of the following detailed description in connection with the drawings.

BRIEF DESCRIPTION OF THE DRAWINGS

The invention will be described in detail with reference to the following drawings wherein.

DETAILED DESCRIPTION OF PREFERRED EMBODIMENTS

Figure 1:
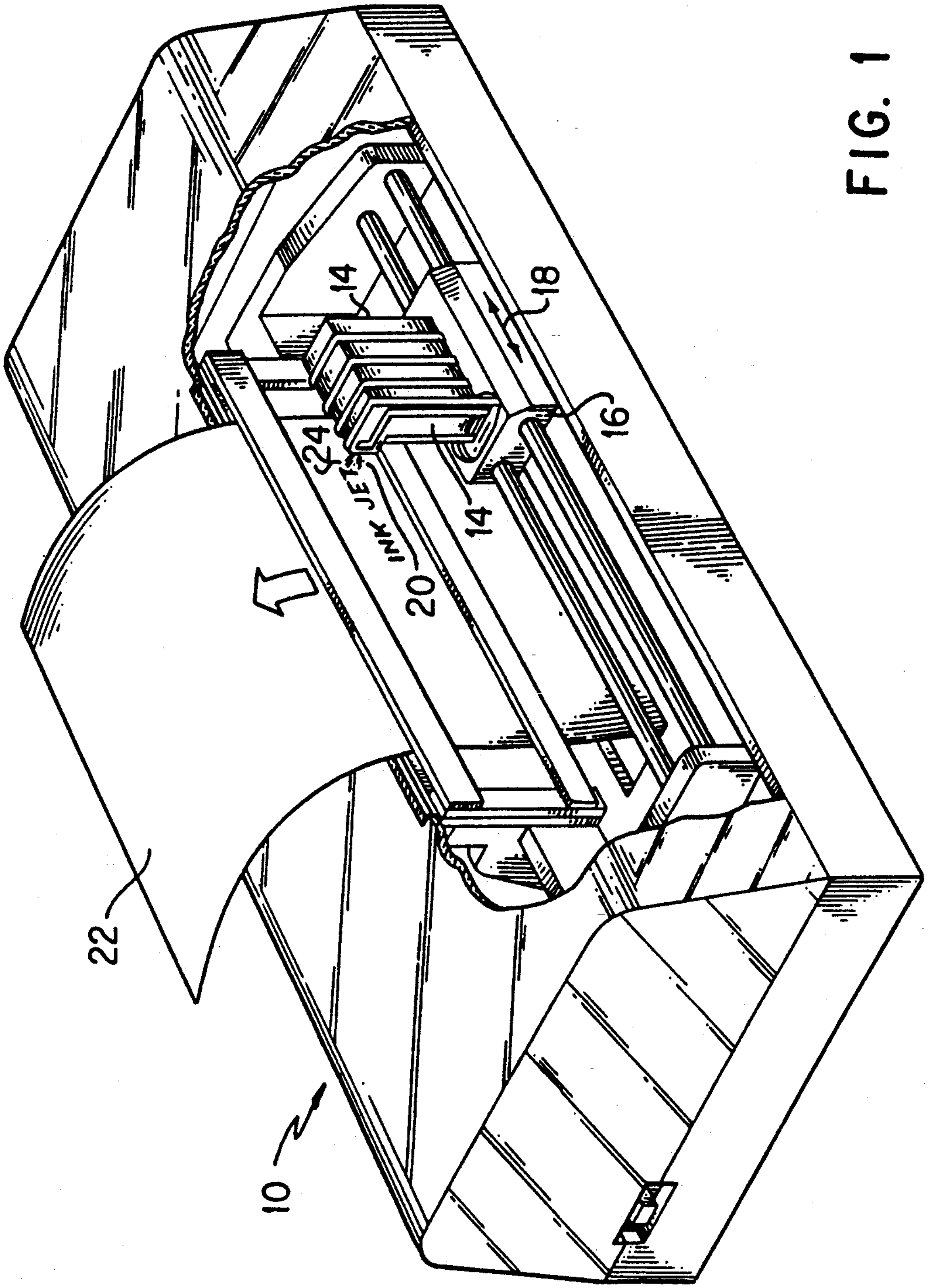
FIG. 1 is a perspective view of a thermal ink jet printer to which the present invention is directed.

A typical carriage-type, multicolor, thermal ink jet printer 10 is shown in FIG. 1. A linear array of ink droplet producing channels (not shown) is housed in each printhead 14. One or more printheads 14 are replaceably mounted on a reciprocating carriage assembly 16, which reciprocates back and forth in the direction of the arrows 18 as shown. The ink channels terminate with orifices or nozzles 20 which are aligned perpendicular to the surface of a recording medium 22, such as paper. Droplets 24 are expelled and propelled to the recording medium 22 from the nozzles 20 in response to digital data signals received by a printer controller, which in turn selectively addresses individual heating elements with a current pulse, the heating elements being located in the printhead channels a predetermined distance from the nozzles 20. The current pulses passing through the printhead heating elements vaporize the ink contacting the heating elements and produce temporary vapor bubbles to expel the droplets of ink 24 from the nozzles 20. A single printhead array may be used, or multiple arrays may be butted together to form a large array or a pagewidth printhead. Additionally, one or more of these arrays may be stacked such that each array expels a different color of ink for multicolor printing.

Figure 2:
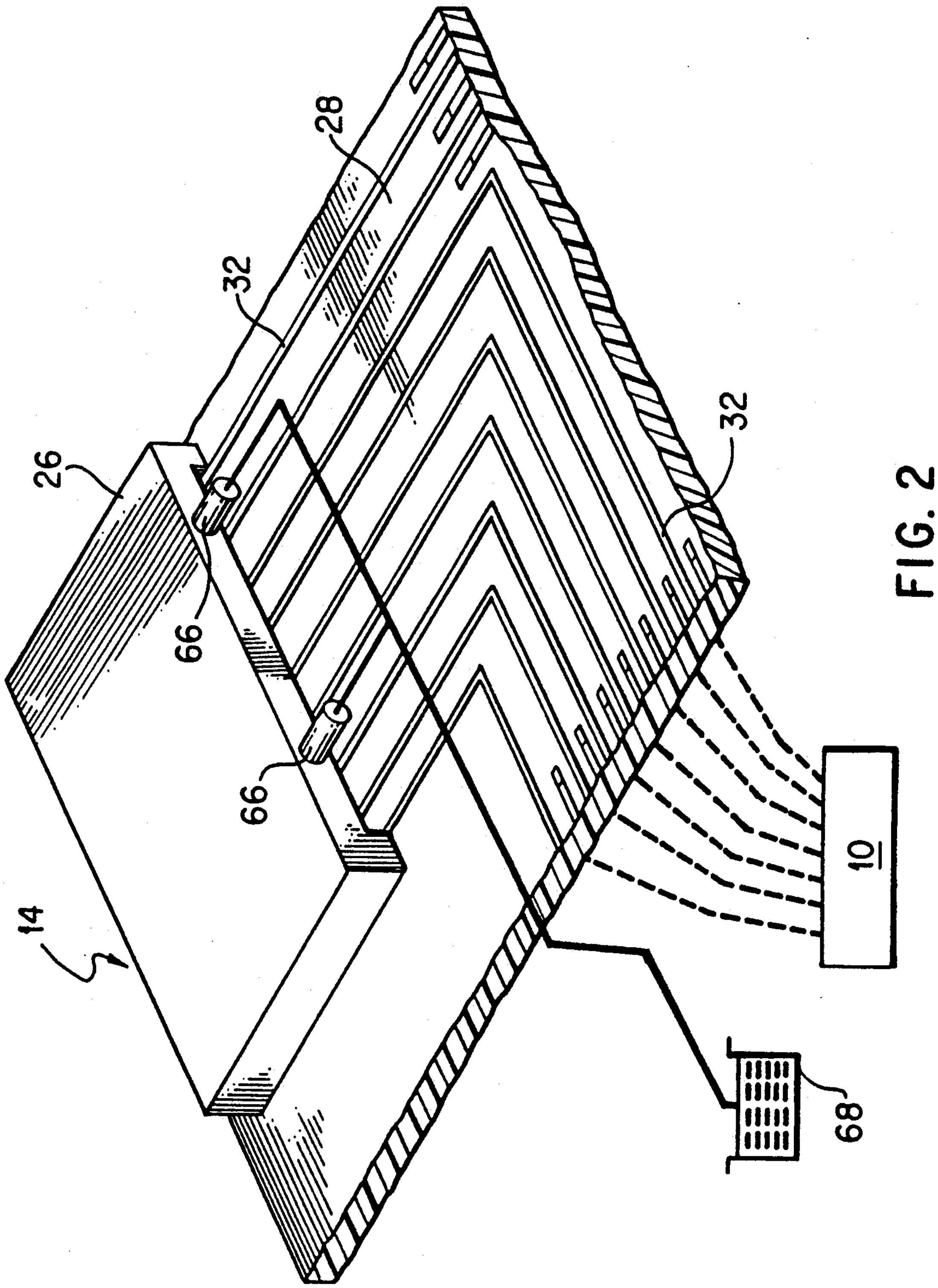
FIG. 2 is an isometric partial view of an assembled printhead according to the present invention including connection with other printer sections.
Figure 3:
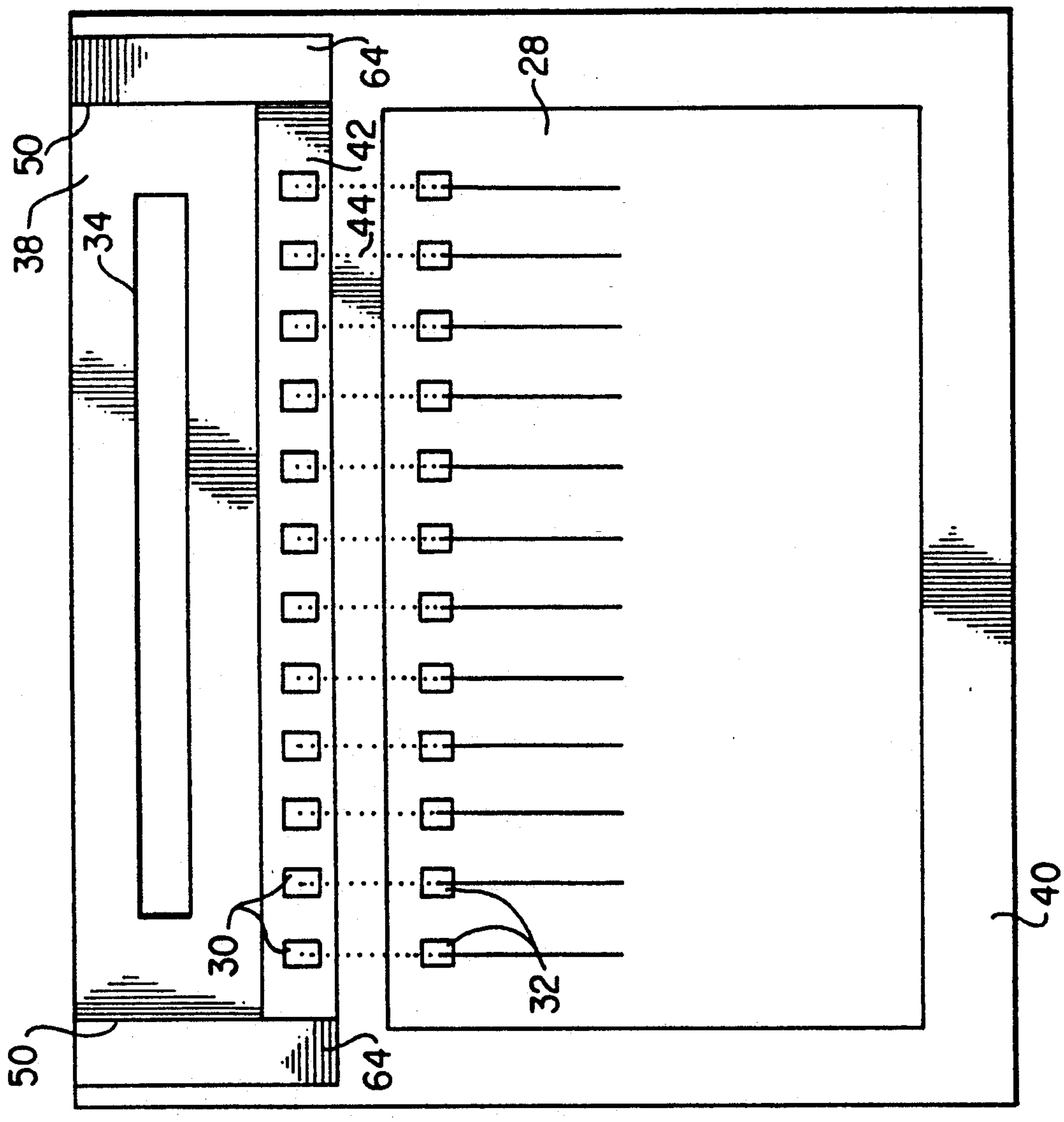
FIG. 3 is a top view of a thermal ink jet die and an interconnection board which have been bonded to a heat sinking substrate.
Figure 4:
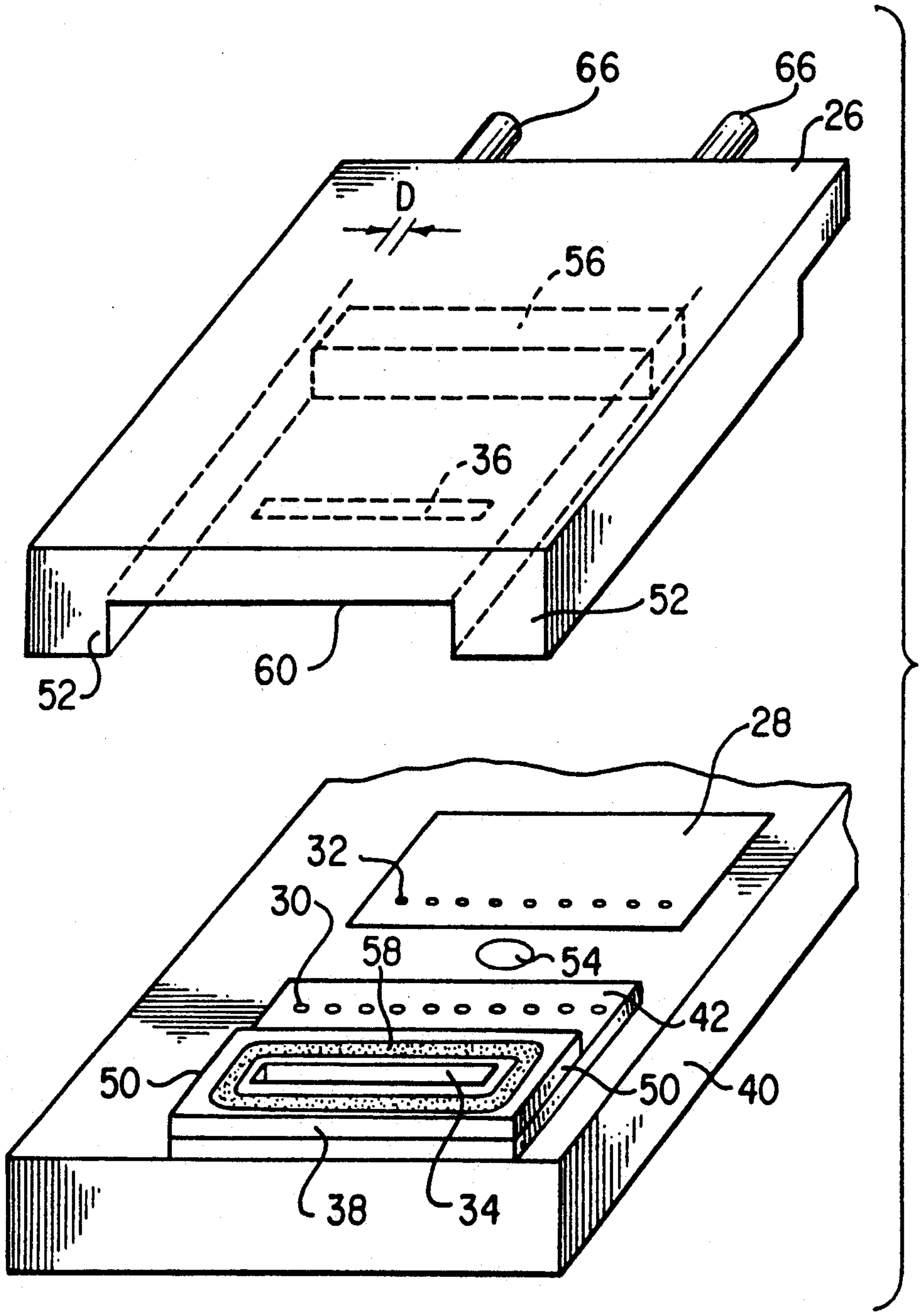
FIG. 4 is a perspective view of a printhead die and a manifold which is positioned over an ink inlet of the die prior to bonding.

As shown in FIG. 2, a printhead 14 includes an ink supply manifold 26 fixedly mounted on an interconnection board or daughter-board 28 having electrodes 32. The interconnection board may be wire bondable PC board, thick film on ceramic or thin film on ceramic for example. Beneath the manifold 26 and as shown in FIGS. 3–4 are a heater plate 42 having electrodes 30 and a thermal ink jet die 38 having an ink inlet 34. The interconnection board 28, the heater plate 42 and thermal ink jet die 38 are mounted on a heat sinking substrate 40, with the manifold 26 attached to the substrate 40 and overlying the heater plate 42, thermal die 38 and a portion of the interconnection board 28. The electrodes 32 of the interconnection board are bonded by bonds 44 to the electrode 30 of the heater 42 as shown in FIG. 3. FIG. 4 does not show the bonds 44 for clarity. However, FIG. 4 illustrates that the ink inlet 34 of the thermal ink jet die 38 is sealingly positioned against and coincident with an ink inlet 36 in the manifold 26. The manifold 26 also includes vent tubes 66 which connect the manifold with an ink supply 68.

A plan view of the L-shaped interconnection board 28 is shown in FIG. 2. This view is of the side containing the printhead 14. Interconnection board electrodes 32 are on a one-to-one ratio with the electrodes 30 of the printhead 14 as shown in FIG. 3. The printhead 14 is sealingly and fixedly attached to the interconnection board 28 and its electrodes 30 are wire bonded by bonds 44 to the interconnection board electrodes 32. All of the electrodes 30,32 are passivated and the wire bonds 44 are encased in an electrical insulative material such as epoxy. Opposite ends of electrodes 32 are connectably attached to appropriate controls in the printer 10.

With reference to FIG. 3, the thermal ink jet die 38 is adjacent to electrical interconnection board 28, both of which are bonded onto the heat sinking substrate 40. Prior to bonding of die 38 onto substrate 40, a screen printed silver filled die bonding epoxy 64 is patterned over an area where the die is to be bonded. It is to be understood that in FIG. 3, the epoxy 64 is located under the die 38 and optionally extends beyond ends 50 of the die 38 as shown. On the die 38, the ink inlet 34 is shown as a rectangle. Wire bond pads or electrodes 30 from a heater plate portion 42 of the printhead 14 are shown as rectangles. Wire bonds 44 to the corresponding pads or electrodes 32 on the electrical interconnection board 28 are shown in dotted lines. Electrical connection from the board 28 to printer 10 are shown in FIG. 2, and do not form part of the present invention.

Figure 5:
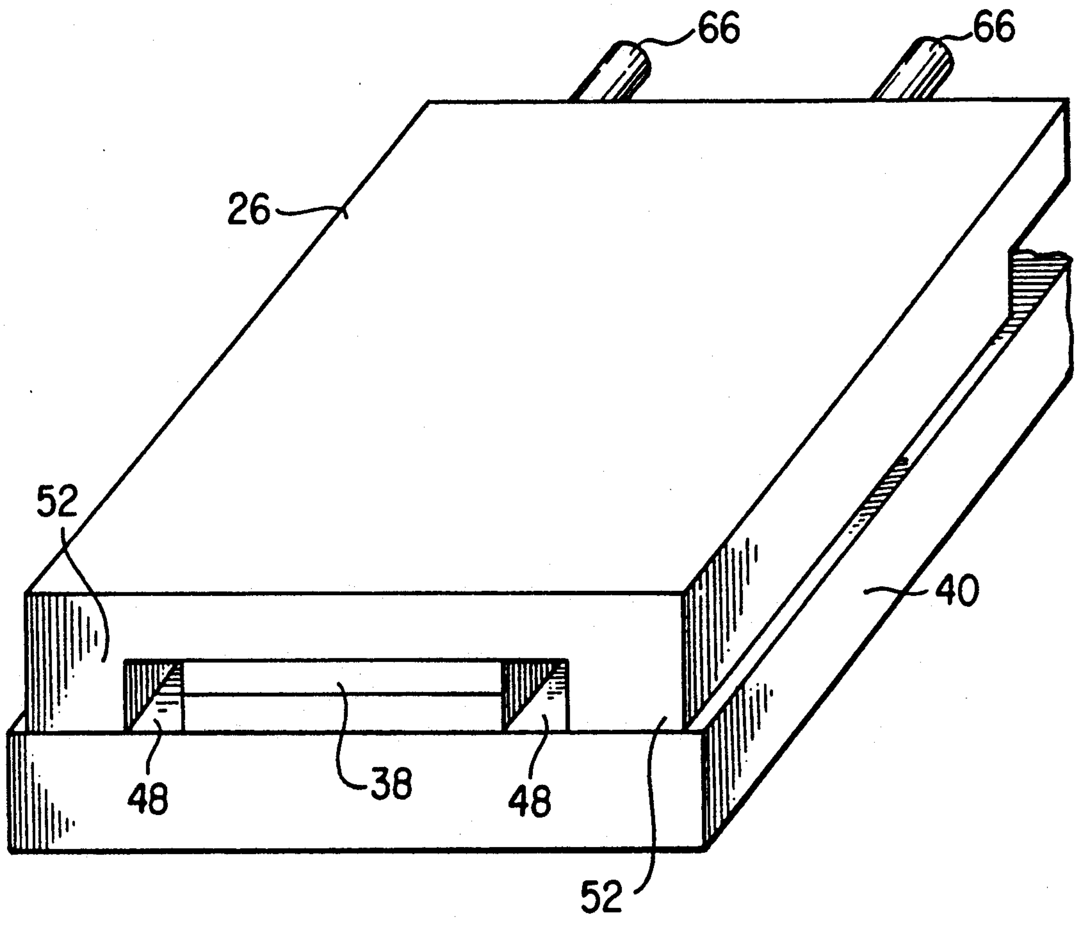
FIG. 5 is a perspective view of the printhead die and manifold of FIG. 4 assembled.

FIG. 4 is a perspective view of the components shown in FIG. 3, including ink manifold 26 prior to assembly. FIG. 5 is a perspective view of the components of FIG. 4 in an assembled state. The manifold 26 include legs 52 which rest on the substrate 40 and straddle ends 50 of the thermal ink jet die 38. An air gap 48 can exist between the legs 52 and ends 50 of the die 38 when the structure is assembled as in FIG. 5. According to the present invention, a wire bond encapsulant is applied in a manner so as to provide structural bonding of the manifold 26 to the other printhead components, and also to fill any air gaps 48 between ends of the die 50 and legs or sides 52 of the manifold 26.

Figure 6:
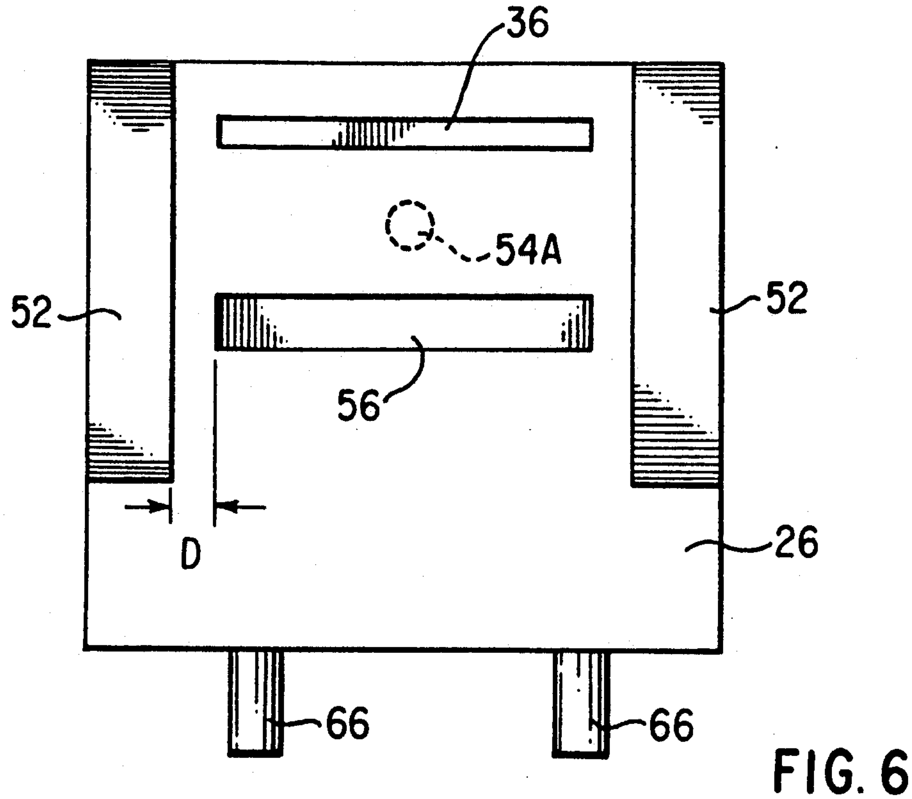
FIG. 6 is a bottom side view of a manifold according to the present invention.

A preferred embodiment is shown in FIGS. 4 and 6. In this embodiment, the substrate 40 has a through hole 54 preferably formed by orientation dependent etching located near the center of the row of wire bonds 44 between the die 38 and the interconnection board 28. In addition, the underside 60 of the manifold 26 as shown in FIG. 6 includes an encapsulation dam bar 56 which, when the manifold 26 is assembled onto the printhead 14, is located over the interconnection board 28 just behind the row of wire bonds 44. In FIG. 6, 54A represents the relative location of the through hole 54 on the substrate 40 but is not a through hole on the manifold 26. However, alternatively instead of locating the throughhole 54 in the substrate 40 it may be provided in the manifold 26 as shown as 54A. In this case, throughhole 54 would not be provided on the substrate. This may be advantageous in that it would allow encapsulation injection from the top rather than the bottom. The manifold 26 may be molded with the hole and the bar.

In order to assemble the manifold 26, a watertight seal 58 is first applied around the ink inlet 34 of the die 38 so as to seal its connection to the ink inlet 36 of the manifold 26 (FIG. 4). The water tight seal 58 may be made by screen printing or syringe deposition. Alternatively, the water tight seal 58 may be formed on the underside 60 of the manifold 26 by syringe deposition. The manifold 26 is then positioned in place, for example, by using registration pins.

Figure 7:
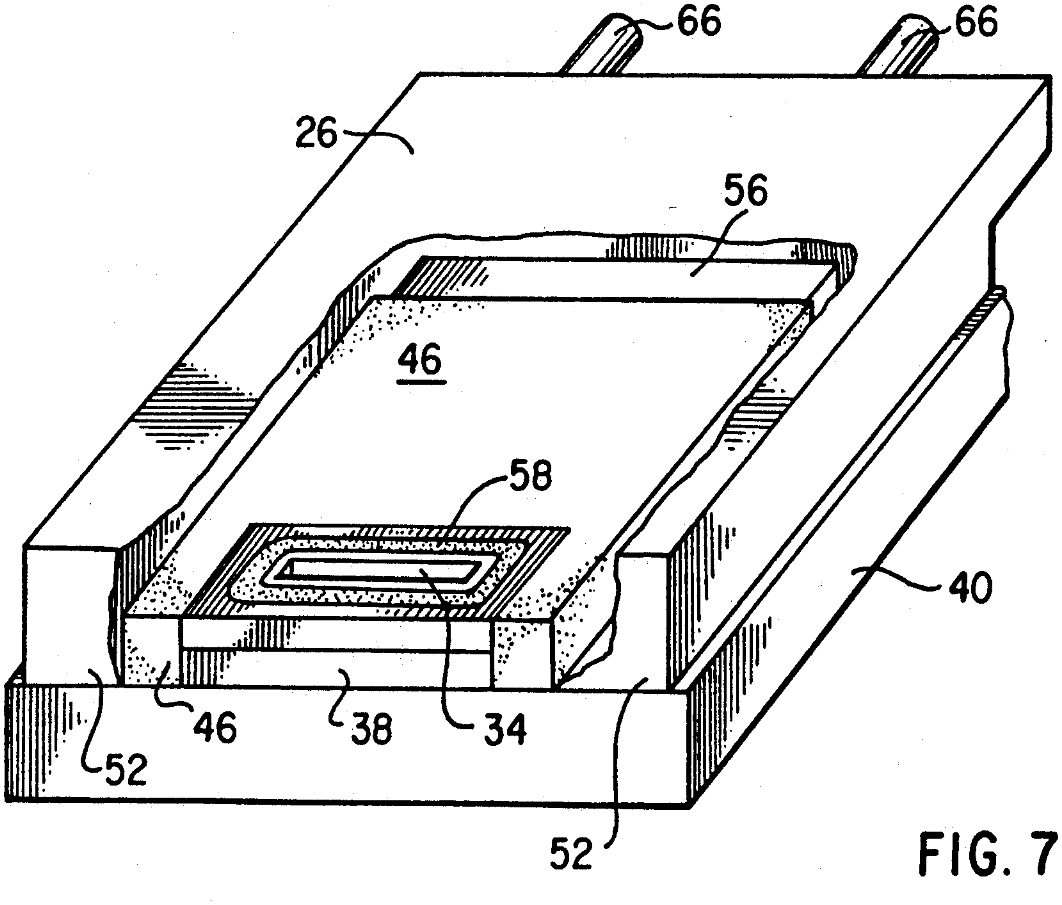
FIG. 7 is a perspective view of the printhead die and manifold of FIG. 4 after encapsulant has been injected, the manifold is shown in outline form to better show the internal components.

In accordance with the present inventive process, a liquid encapsulate such as Hysol 4323 is injected from the underside of the substrate 40 through the through hole 54 between the thermal ink jet die 38 and the interconnection board 28. The encapsulant flows laterally along the path of least resistance along the rows of wire bonds 44, being constrained by the underside 60 of the manifold (on the top), the substrate 40 (on the bottom), the die 38 (in front), and the dam encapsulation bar 56 (in the rear). This encapsules the wire bonds 44. Preferably, the dam bar 56 is the same thickness (vertical dimension) as the die, i.e., a 1:1 ratio. However, it may be desirable that dam bar 56 does not extend all the way down to contact the interconnection board 28 (i.e., a vertical space (not shown) exists between the dam bar 56 and the substrate 40), allowing some encapsulant to spill past the bar 56 and to allow for tolerances between components. The dam bar 56 also may be of a length less than the distance between the legs 52 such that a lateral spacing D exists between ends of the dam bar 56 and the legs 52 to also allow limited encapsulant flow therearound. The vertical and lateral spacings may be advantageous in that they give greater area for structural bonding of the manifold 26 to the other printhead components and also compensate for tolerances between elements. Because the through hole 54 is located near the center of the die 38, the encapsulant 46 reaches both ends of the die 50 at approximately the same time. It then begins to flow toward the front of the printhead to fill the air gaps 48 between the ends of the die 50 and the manifold legs 52 at the side. The encapsulant 46 (see FIG. 7) can be watched by an operator as it flows and injection can be stopped when the encapsulant 46 is nearly to the front of the printhead 14. Preferably, this is done using an optical sensor to detect the extent of encapsulant flow.

Additionally, in the case where the substrate is the same color as the encapsulant (typically black), it is preferred to provide a white background for viewing the flow of the encapsulant. This may be accomplished by extending the screen printed silver filled die bonding epoxy 64, as shown in FIG. 3, since the silver epoxy on a dark substrate makes it easier to see when the black encapsulant 46 covers it up. The encapsulant is then cured to finish the assembly process. The finished printhead and interconnection board can now be assembled onto various printer components to complete the printer.

This encapsulation process provides in one step 1) reliable encapsulation of the entire row of wire bonds; 2) enhanced structural bonding of the manifold to the substrate, the die and the interconnection board; 3) filling of air gaps at the ends of the die so that volatile ink components may not escape through the gaps; and 4) back up sealing of the watertight seal along the rear of the printhead die.

The invention has been described with reference to the preferred embodiments thereof, which are intended to be illustrative and not limiting. Various changes may be made without departing from the spirit and scope of the invention as defined in the appended claims.

What is claimed is:

1. A method of bonding components of a thermal ink jet printhead, comprising the steps of:

positioning a manifold having opposing legs over a printhead die and an interconnection board, both being previously bonded to a heat sinking substrate having a through hole located between said printhead die and said interconnection board; and injecting a liquid encapsulant into the through hole and into a cavity defined between the substrate and the manifold to encapsulate wire bonds between said printhead die and said interconnection board and fill any air gap between said printhead die and the legs of said manifold along a front face thereof.

2. The method of claim 1, further comprising the step of stopping flow of encapsulant in a forward direction toward the front face of the printhead when said encapsulant flows substantially to the front face of said printhead.

3. The method of claim 1, further comprising the step of constraining said encapsulant in a rearward direction by a dam bar located on a bottom surface of said manifold and transverse to said manifold legs.

4. The method of claim 3, wherein said constraining step allows limited flow of encapsulant past said dam bar to enhance structural bonding.

5. The method of claim 2, wherein said step of stopping flow of encapsulant includes sensing a position of the flow by an optical sensor.

6. The method of claim 2, wherein said step of stopping flow of encapsulant includes sensing a position of the flow by visual inspection by an operator.

7. The method of claim 6, further including a step of coloring said substrate to a color different from said encapsulant to aid in detection of encapsulant flow.

8. The method of claim 7, wherein said step of coloring the substrate to a different color includes providing said substrate with a screen printed silver filler die bonding epoxy to provide a white background for the encapsulant.

9. A thermal ink jet printhead comprising:

a heat sinking substrate having a through hole formed therein;

a printhead die mounted on the substrate on one side of the through hole and comprising a channel section with an ink inlet and a heater section with a row of wire bond pads;

an interconnection board bonded to the substrate on an opposite side of the through hole and having a corresponding row of wire bond pads;

a plurality of wire bonds electrically interconnecting the row of wire bond pads on the heater section and the interconnection board;

a manifold mounted to the substrate and defining therein a cavity for reception of the printhead die, interconnection board and plurality of wire bonds, the manifold including an ink inlet for communication with the ink inlet of the channel section;

constraining means adjacent the interconnection board for constraining the flow of encapsulant; and the through hole communicating with the cavity and the cavity containing an encapsulant injected through the through hole for encapsulating the wire bonds, sealing air gaps between the manifold and the printhead die, and bonding the manifold to the substrate, wherein the channel section, heater section, through hole and interconnection board define a longitudinal direction of the substrate, the one side of the through hole defining a forward direction and the other side of the through hole defining a rearward direction, the cavity having a width in a transverse direction perpendicular to the longitudinal direction, and said constraining means constrains the flow of encapsulant in the rearward direction.

10. The printhead of claim 9, wherein the constraining means is a dam bar mounted on an undersurface of the manifold and extending substantially across the cavity in the transverse direction.

11. The printhead of claim 9, wherein the manifold has legs extending in the longitudinal direction and straddling the printhead die and interconnection board, the legs defining the width of the cavity and having a height defining a depth of the cavity.

12. The printhead of claim 11, wherein the constraining means is a dam bar mounted on an undersurface of the manifold and extending substantially across the cavity in the transverse direction.

13. The printhead of claim 12, wherein a length of the dam bar in the transverse direction is less than the width of the cavity to define at least one space between the dam bar and the legs.

14. The printhead of claim 12, wherein the dam bar extends from the undersurface of the cavity to a depth less than the depth of the cavity to define a space between the dam bar and substrate.

15. The printhead of claim 9, wherein the through hole is centrally located in the transvere direction between the heater section and the interconnection board.

16. The printhead of claim 11, wherein a length in the traverse direction of the printhead is less than the width of the cavity to define at least one air gap between the legs and the printhead die, the air gap being sealed by the encapsulant.

17. A thermal ink jet printhead comprising:

a heat sinking substrate;

a printhead die mounted on one side of the substrate and comprising a channel section with an ink inlet and a heater section with a row of wire bond pads;

an interconnection board bonded to the substrate on the same side as said printhead die and adjacent therewith, the interconnection board having a corresponding row of wire bond pads;

a plurality of wire bonds electrically interconnecting the row of wire bond pads on the heater section and the interconnection board;

a manifold mounted to the substrate and defining therein a cavity for reception of the printhead die, interconnection board and plurality of wire bonds, the manifold including an ink inlet for communication with the ink inlet of the channel section and a through hole, said manifold further including a dam bar mounted on the undersurface of the manifold and extending substantially across the cavity in a transverse direction; and the through hole communicating with the cavity and the cavity containing an encapsulant injected through the through hole for encapsulating the wire bonds, sealing air gaps between the manifold and the printhead die, and bonding the manifold to the substrate, wherein the channel section, heater section, through hole and interconnection board define a longitudinal direction of the substrate, the one side of the through hole defining a forward direction and the other side of the through hole defining a rearward direction, the cavity having a width in the transverse direction perpendicular to the longitudinal direction, said dam bar constraining the flow of encapsulant in the rearward direction.

18. A method of bonding components of a thermal ink jet printhead, comprising the steps of:

positioning a manifold having opposing legs over a printhead die and an interconnection board, both being previously bonded to a heat sinking substrate and located adjacent one another on a same side of said substrate in a longitudinal plane, said manifold, printhead die and substrate defining a cavity therebetween, said cavity having a through hole communicating therewith and located perpendicular to the plane;

injecting a liquid encapsulant into the through hole and into the cavity to encapsulate wire bonds between said printhead die and said interconnection board and fill any air gap between said printhead die and the legs of said manifold along front face thereof.

19. The method of claim 18, wherein the through hole is located on said substrate and said step of injecting a liquid encapsulant is performed by injecting the encapsulant from a bottom of the substrate into said cavity.

20. The method of claim 18, wherein the through hole is located on said manifold and said step of injecting a liquid encapsulant is performed by injecting the encapsulant from a top of the manifold into said cavity.

* * * * *

UNITED STATES PATENT AND TRADEMARK OFFICE

CERTIFICATE OF CORRECTION

PATENT NO. : 5,258,781

DATED : November 2, 1993

INVENTOR(S) : Peter J. John

It is certified that error appears in the above-indentified patent and that said Letters Patent is hereby corrected as shown below:

On title page, item [54] and column 1, line 2, change "STRUCTURE" to --STRUCTURAL--

Signed and Sealed this

Third Day of May, 1994

Attest:

BRUCE LEHMAN

Attesting Officer

Commissioner of Patents and Trademarks